United States Patent
Horiuchi

(10) Patent No.: US 6,862,061 B2
(45) Date of Patent: Mar. 1, 2005

(54) RUBBING DEVICE FOR PROVIDING UNIFORM ALIGNMENT IN LIQUID CRYSTAL DISPLAY

(75) Inventor: Toshihiro Horiuchi, Kagoshima (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/374,601

(22) Filed: Feb. 25, 2003

(65) Prior Publication Data

US 2003/0160926 A1 Aug. 28, 2003

(30) Foreign Application Priority Data

Feb. 27, 2002 (JP) ....................... 2002-051417

(51) Int. Cl.[7] .............................................. G02F 1/1337
(52) U.S. Cl. ...................... 349/126; 349/123; 349/124; 492/28; 492/29; 492/30; 492/36
(58) Field of Search ................................ 349/123, 124, 349/126, 128–132; 492/28–30, 36

(56) References Cited

U.S. PATENT DOCUMENTS 6,219,123 B1 * 4/2001 Naito et al. ................. 349/126

FOREIGN PATENT DOCUMENTS

| JP | 11-202334 | 7/1999 | ........... G02F/1/337 |
| JP | 2000-171803 | 6/2000 | ........... G02F/1/337 |

* cited by examiner

Primary Examiner—Tarifur R. Chowdhury
Assistant Examiner—Michael H. Caley
(74) Attorney, Agent, or Firm—Hayes Soloway P.C.

(57) ABSTRACT

A rubbing device for alignment-treating an alignment layer on a substrate of a liquid crystal display, and the liquid crystal display in which the alignment layer on the substrate is rubbed by using the rubbing device. The rubbing device comprises a rubbing roller having a roller base and a rubbing cloth stuck on the outer surface of the roller base. The rubbing cloth has a plurality of slits formed parallel along the longitudinal direction of the roller base. The rubbing cloth may also comprises a plurality of separate rubbing cloth members which are stuck on the roller base via gaps therebetween and each of which has at least one slit formed parallel along the longitudinal direction of the roller base.

13 Claims, 2 Drawing Sheets

PRIOR ART

RUBBING DEVICE FOR PROVIDING UNIFORM ALIGNMENT IN LIQUID CRYSTAL DISPLAY

FIELD OF THE INVENTION

The present invention relates generally to a rubbing device for a liquid crystal display, and more particularly to a rubbing roller which has a rubbing cloth stuck thereon and which is used for uniformly rubbing an alignment layer on a substrate of a liquid crystal display panel.

BACKGROUND OF THE INVENTION

A liquid crystal display panel generally has a pair of transparent substrates opposed to each other, and a liquid crystal portion composed of liquid crystal molecules disposed between the pair of substrates. An inner surface of each of the substrates has an alignment layer which is alignment-treated to provide a predetermined alignment direction of the liquid crystal molecules. The alignment treatment of each of the substrates is performed by using a rubbing device. The rubbing device has a rubbing roller for rubbing the surfaces of the substrates before assembling the substrates into a liquid crystal display panel. The rubbing roller has a rubbing cloth stuck on a roller base.

When the rubbing cloth is stuck on the roller base, there always exists a seam between opposing edges of the rubbing cloth. In case the substrates are rubbed by using such rubbing roller, alignment direction becomes uneven in some or all portions of areas where the seam of the rubbing cloth contacts the substrate. Therefore, display unevenness or defect of the liquid crystal display panel occurs.

In order to obviate such disadvantage, it may be possible, as a first method and as shown in FIG. 4, to make a seam or gap 104 between the opposing edges of a rubbing cloth 102 as narrow as possible, by controlling the length of the rubbing cloth 102 along the circumference of a roller base 101. By fabricating a rubbing roller in this way, the width of the seam 104 can be approximately zero, and an influence of the seam 104 can be reduced.

As a second method and as shown in FIG. 5, it is also possible to separate a rubbing cloth into a plurality of oblong rubbing cloth members 202 and to stick the members onto the surface of a roller base 201 such that each gap (or seam) 204 between adjacent rubbing cloth members 202 becomes as narrow as possible and such that a plurality of seams 204 are produced. Thereby, all portions of the surface of the alignment layer coated on the substrate of a liquid crystal display panel to be rubbed contact the seam or seams 204, and it is possible to uniformly rub the alignment layer.

However, in the above-mentioned first method, it is necessary to precisely control the length of the rubbing cloth 102 along the circumference of a roller base 101 and to stick the rubbing cloth 102 precisely on the roller base such that the seam or gap 104 between the opposing edges of a rubbing cloth 102 can be as narrow as possible, taking the expansion and contraction caused by the temperature variation and the like into consideration. Therefore, it is usually very difficult to precisely control the length of the rubbing cloth 102 and to precisely stick the rubbing cloth 102 on the roller base 101.

Also, in the above-mentioned second method, it is also necessary to precisely control the length of the rubbing cloth members 202 along the circumference of a roller base 101 and to stick the rubbing cloth members 202 precisely on the roller base such that the gaps between the opposing edges of the rubbing cloth members become as narrow as possible or such that the gaps between the opposing edges of the rubbing cloth members are precisely controlled, taking the expansion and contraction caused by the temperature variation and the like into consideration. It is usually very difficult to precisely stick the rubbing cloth members 202 on the roller base 201 such that the gaps between the rubbing cloth members are precisely controlled. Also, the process of sticking a plurality of separate rubbing cloth members on the roller base requires close attention, becomes complicated and takes a long time.

SUMMARY OF THE INVENTION

Therefore, it is an object of the present invention to provide a rubbing device which can uniformly perform rubbing or alignment treatment for a liquid crystal display.

It is another object of the present invention to provide a rubbing device which can uniformly perform rubbing or alignment treatment of an alignment layer of a liquid crystal display without producing unevenness of alignment caused by a seam of a rubbing cloth stuck on a roller base.

It is still another object of the present invention to provide a rubbing device which can uniformly perform rubbing or alignment treatment of an alignment layer of a liquid crystal display and which can be easily fabricated.

It is still another object of the present invention to provide a liquid crystal display which has uniform alignment direction in each alignment layer and which thereby has high image display quality.

It is still another object of the present invention to obviate the disadvantages of the conventional rubbing devices.

According to an aspect of the present invention, there is provided a rubbing device for alignment-treating an alignment layer on a substrate of a liquid crystal display, the rubbing device comprising: a rubbing roller having a roller base and a rubbing cloth stuck around the outer surface of the roller base; wherein the rubbing cloth has at least one slit formed parallel along the longitudinal direction of the roller base.

In this case, it is preferable that the rubbing cloth has a plurality of slits which are disposed parallel with each other.

It is also preferable that the plurality of slits are disposed at regular intervals along the circumference of the roller base.

It is further preferable that each of the slits has the same width as the width of the gap between end portions of the rubbing cloth opposing to each other on the surface of the roller base.

It is advantageous that the width of each of the slits and the gap between end portions of the rubbing cloth is equal to or smaller than 1 mm.

It is also advantageous that the space between the slits and the space between the gap of the opposing end portions of the rubbing cloth and the slits are equal to each other.

It is further advantageous that the rubbing cloth comprises a plurality of separate rubbing cloth members stuck around the roller base via gaps therebetween, each of the rubbing cloth members having at least one slit formed parallel along the longitudinal direction of the roller base.

It is preferable that each of the rubbing cloth members has a plurality of slits, and the slits of each of the rubbing cloth members are disposed at regular intervals along the circumference of the roller base.

It is also preferable that each of the slits has the same width as the width of each gap between end portions of the rubbing cloth members opposing to each other on the surface of the roller base.

It is further preferable that the space between the slits and the space between each gap of the opposing end portions of the rubbing cloth members and the slits are equal to each other.

According to another aspect of the present invention, there is provided a liquid crystal display having a pair of substrates opposed to each other via a liquid crystal layer disposed therebetween, wherein each of the substrates has an alignment layer formed on the surface of the substrate on the side of the liquid crystal layer, and wherein the alignment layer on each of the substrates is alignment-treated by using a rubbing device comprising a rubbing roller having a roller base and a rubbing cloth which is stuck around the outer surface of the roller base and which has a plurality of slits formed parallel along the longitudinal direction of the roller base.

In this case, it is preferable that the rubbing cloth comprises a plurality of separate rubbing cloth members stuck around the roller base via gaps therebetween, each rubbing cloth members having at least one slit formed parallel along the longitudinal direction of the roller base.

By using the rubbing device having a structure mentioned above, the whole surface of an alignment layer to be rubbed contacts the seam and/or slit(s) of a rubbing cloth, and rubbing strength, rubbing direction and the like become uniform throughout the alignment layer. Therefore, it becomes possible to uniformly perform alignment treatment, i.e., rubbing, on the alignment layer formed on a substrate for a liquid crystal display.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, an explanation will now be made on a rubbing device according to an embodiment of the present invention.

Figure 1:
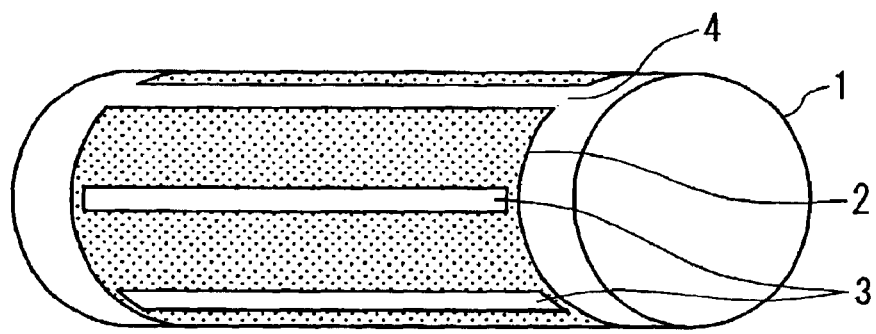
FIG. 1 is a perspective view schematically illustrating a rubbing roller of a rubbing device according to an embodiment of the present invention.
Figure 2:
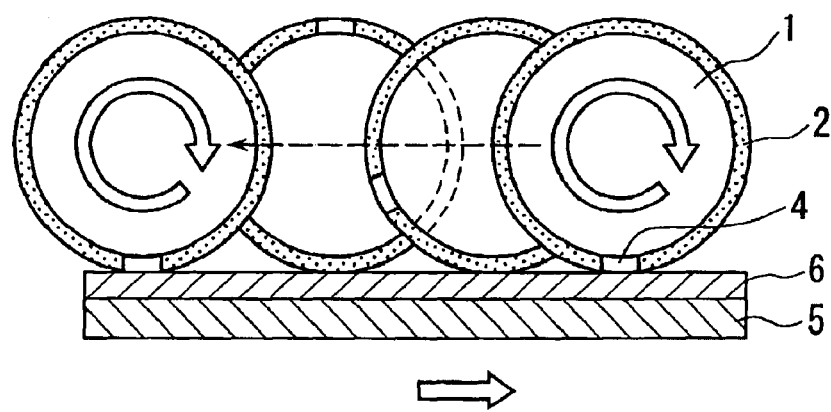
FIG. 2 is a schematic illustration showing a way of rubbing by the rubbing device according to the embodiment of the present invention shown in FIG. 1.

FIG. 1 schematically illustrates a rubbing roller of a rubbing device according to an embodiment of the present invention. FIG. 2 schematically illustrates a way of rubbing by a rubbing device 10 which includes the rubbing roller shown in FIG. 1. In FIG. 2, the surface of an alignment layer coated on a substrate for a liquid crystal display panel is rubbed by the rubbing roller while the substrate is transported relative to the rubbing roller.

As shown in FIG. 1, in the rubbing roller according to the present invention, a rubbing cloth 2 is stuck on the surface of a roller base 1 having a cylindrical shape. The rubbing cloth 2 has a plurality of slits 3 formed in the longitudinal direction of the roller base 1. The length of each slit 3 along the longitudinal direction of the roller base 1 is slightly shorter than the width of the rubbing cloth 2. Therefore, each of the slits 3 does not divide the rubbing cloth 2 into oblong rubbing cloth members, but each of the slits 3 is formed within the area of the rubbing cloth 2. Each of the slits 3 forms a quasi-seam of the rubbing cloth 2. Also, the area between opposing end portions, i.e., edges, of the rubbing cloth 2 becomes a seam 4.

As shown in FIG. 2, the rubbing roller, which has the rubbing cloth 2 with the slits 3 stuck thereon (not shown in the drawing) and which has the seam 4 formed by the opposing end portions of the rubbing cloth 2, is rotated and contacted the alignment layer 6 formed on a substrate 5 for a liquid crystal display panel. By using the rubbing roller according to the present invention, it is possible to suppress unevenness of rubbing intensity, rubbing direction and the like, and to perform uniform alignment treatment of the alignment layer 6.

Figure 4:
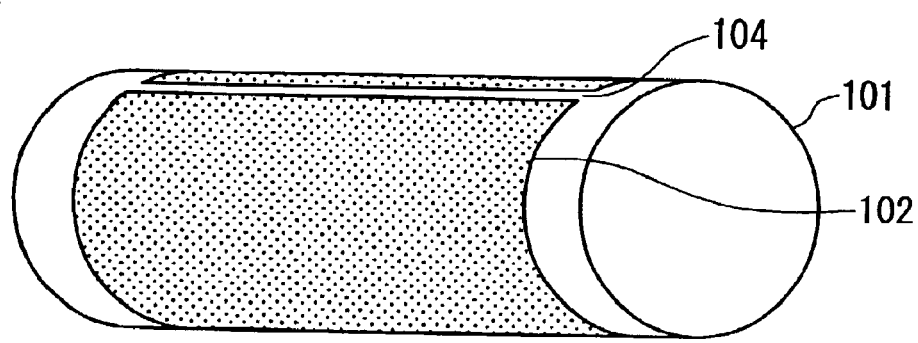
FIG. 4 is a perspective view schematically illustrating a rubbing roller of a conventional rubbing device.

More particularly, in the conventional rubbing roller shown in FIG. 4, one seam 104 is produced when the rubbing cloth 102 is stuck on the roller base 101. Therefore, the seam 104 causes discontinuity of alignment condition, and periodically produces areas which are differently aligned from other peripheral areas on the alignment layer.

However, in the rubbing roller according to the present embodiment, a plurality of slits 3 are formed in the rubbing cloth 2 as shown in FIG. 1, and the quasi-seam portions of the rubbing cloth 2 are formed regularly along the circumference of the rubbing roller. After coating and burning a material of the alignment layer 6 on the substrate 5 for a liquid crystal display panel, the substrate 5 with the alignment layer 6 is alignment treated, i.e., rubbed, by using the rubbing roller according to the present invention. In this case, all the surface portions to be rubbed of the alignment layer 6 contacts the seam 4 and/or the slit(s) 3, and areas which are periodically differently aligned from other peripheral areas are not produced on the alignment layer like, or the space between differently aligned portions can be very small. In case the space between differently aligned portions is smaller than, for example, 1.2 mm, unevenness of displayed image becomes negligible in appearance.

In the rubbing roller shown in FIG. 1, the slits 3 are formed such that the distances between the seam 4 and the slit 3 and between the slits 3 become the same. In this embodiment, the slits 3 are formed regularly along the circumference of the roller base 1. The width of each slit 3 may be the same as the width of the seam 4, or may be changed depending on rubbing conditions. The number of the slits may be changed depending on rubbing conditions. For example, the number of the slits can be selected such that the space between differently aligned portions becomes smaller than, for example, 1.2 mm.

As mentioned above, in the present invention, the slits are formed in the rubbing cloth of the rubbing roller, and quasi-seams are formed on the circumference of the rubbing roller. Thereby, the whole surface of the alignment layer to be rubbed contacts the seams (slits) of the rubbing roller. Therefore, it is possible to avoid occurrence of areas which are alignment treated differently by the seam portion from other areas which are alignment treated by the rubbing cloth portion. As a result, occurrence of display unevenness or defect of a liquid crystal display panel can be avoided. Further, according to the present invention, unlike the conventional rubbing roller, very high precision in sticking the rubbing cloth on the roller base is not required, and process of sticking the rubbing cloth on the roller base does not require close attention and long time. Also, according to the present invention, the following advantages are obtained.

Figure 5:
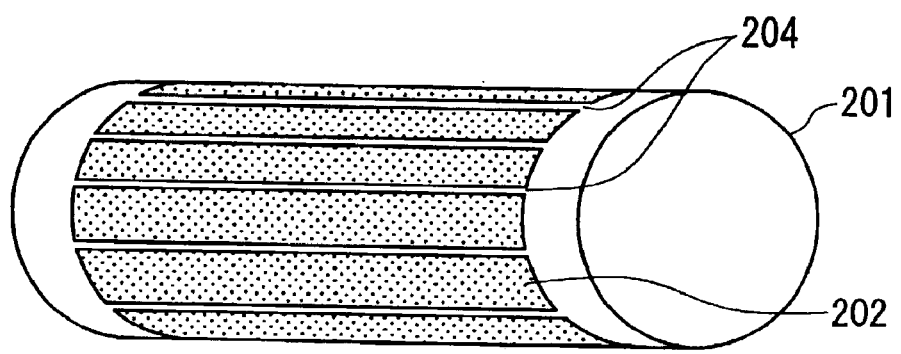
FIG. 5 is a perspective view schematically illustrating a rubbing roller of another conventional rubbing device.

(1) Unlike the conventional rubbing roller shown in FIGS. 4 and 5, in the present invention, it is not necessary to tightly control the width of each seam and the width of each rubbing cloth member. It is also possible to make each of the seam(s) and the slits to have a width of, for example, several millimeters. In such case, it is possible to easily avoid the disadvantage of overlap between end portions of the rubbing cloth when the rubbing cloth is wound on the roller base.

(2) Unlike the conventional rubbing roller shown in FIG. 5, in the present invention, number of process steps to wind and stick the rubbing cloth around the roller base can be reduced, and very high precision in sticking the rubbing cloth on the roller base is not required. In the conventional rubbing roller shown in FIG. 5, a plurality of rubbing cloth members must be stuck on the roller base and a plurality of operations are required. On the other hand, in the present invention, the rubbing cloth comprises one sheet of cloth, and, therefore, the rubbing cloth can be stuck on the roller base by one sticking operation. In the present invention, it is not necessary to precisely control the distances between the rubbing cloth members like the conventional rubbing device shown in FIG. 5.

Figure 3:
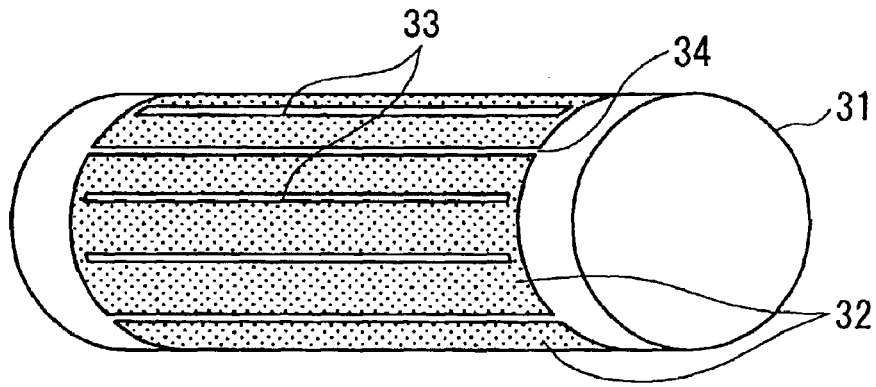
FIG. 3 is a perspective view schematically illustrating a rubbing roller of a rubbing device according to another embodiment of the present invention.

FIG. 3 shows a rubbing roller used in a rubbing device according to another embodiment of the present invention. In the rubbing roller shown in FIG. 3, a rubbing cloth portion is formed by using a plurality of rubbing cloth members 32 each of which has at least one slit 33 therein, preferably a plurality of slits therein. The rubbing cloth members 32 are stuck on a roller base 31 via seams 34 therebetween.

Even in this embodiment, the number of operations in sticking the rubbing cloth members 32 onto the roller base 31 can be reduced, and process of sticking the rubbing cloth members 32 on the roller base 31 does not require close attention and long time, when compared with the conventional rubbing roller.

As mentioned above, according to the present invention, in the rubbing device and the liquid crystal display fabricated by using the rubbing device, the slits are formed in the rubbing cloth of the rubbing roller, and quasi-seams are formed on the circumference of the rubbing roller. Thereby, the whole surface of the alignment layer to be rubbed contacts the seams (slits) of the rubbing roller. Therefore, it is possible to avoid occurrence of areas alignment treated differently by the seam portion from other areas which are alignment treated by the rubbing cloth portion. As a result, occurrence of display unevenness or defect of a liquid crystal display panel can be reduced or avoided.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as falling within the scope of the appended claims.

What is claimed is:

1. A rubbing device for alignment-treating an alignment layer on a substrate of a liquid crystal display, the rubbing device comprising:
   a rubbing roller having a roller base and a rubbing cloth stuck around the outer surface of the roller base;
   wherein the rubbing cloth has at least one slit shorter than a width of said rubbing cloth formed parallel along the longitudinal direction of the roller base.

2. A rubbing device as set forth in claim 1, wherein the rubbing cloth has a plurality of slits which are disposed parallel with each other.

3. A rubbing device as set forth in claim 2, wherein the plurality of slits are disposed at regular intervals along the circumference of the roller base.

4. A rubbing device as set forth in claim 3, wherein the space between the slits and the space between the gap of the opposing end portions of the rubbing cloth and the slits are equal to each other.

5. A rubbing device as set forth in claim 2, wherein each of the slits has the same width as the width of the gap between end portions of the rubbing cloth opposing to each other on the surface of the roller base.

6. A rubbing device as set forth in claim 2, wherein the width of each of the slits and the gap between end portions of the rubbing cloth is equal to or smaller than 1 mm.

7. A rubbing device as set forth in claim 2, wherein the space between the slits and the space between the gap of the opposing end portions of the rubbing cloth and the slits are equal to each other.

8. A rubbing device as set forth in claim 1, wherein the rubbing cloth comprises a plurality of separate rubbing cloth members stuck around the roller base via gaps therebetween, each rubbing cloth members having at least one slit shorter than a width of said rubbing cloth formed parallel along the longitudinal direction of the roller base.

9. A rubbing device as set forth in claim 8, wherein each of the rubbing cloth members has a plurality of slits, and the slits of each of the rubbing cloth members are disposed at regular intervals along the circumference of the roller base.

10. A rubbing device as set forth in claim 8, wherein each of the slits has the same width as the width of each gap between end portions of the rubbing cloth members opposing to each other on the surface of the roller base.

11. A rubbing device as set forth in claim 8, wherein the space between the slits and the space between each gap of the opposing end portions of the rubbing cloth members and the slits are equal to each other.

12. A liquid crystal display having a pair of substrates opposed to each other via a liquid crystal layer disposed therebetween, wherein each of the substrates has an alignment layer formed on the surface of the substrate on the side of the liquid crystal layer, and wherein the alignment layer on each of the substrates is alignment-treated by using a rubbing device comprising a rubbing roller having a roller base and a rubbing cloth which is stuck around the outer surface of the roller base and which has a plurality of slits shorter than a width of said rubbing cloth formed parallel along the longitudinal direction of the roller base.

13. A liquid crystal display as set forth in claim 12, wherein the rubbing cloth comprises a plurality of separate rubbing cloth members stuck around the roller base via gaps therebetween, each rubbing cloth members having at least one slit shorter than a width of said rubbing cloth formed parallel along the longitudinal direction of the roller base.

* * * * *